US006708989B1

(12) United States Patent
Braun

(10) Patent No.: US 6,708,989 B1
(45) Date of Patent: Mar. 23, 2004

(54) AUXILIARY SKIS

(76) Inventor: Kathryn M. Braun, 6841 Xerxes Ave. South, Minneapolis, MN (US) 55423

( * ) Notice: Subject to any disclaimer, the term of this patent is extended or adjusted under 35 U.S.C. 154(b) by 0 days.

(21) Appl. No.: 10/241,674

(22) Filed: Sep. 10, 2002

(51) Int. Cl.[7] .............................................. A63C 17/18
(52) U.S. Cl. ............................ 280/7.12; 280/13; 280/8
(58) Field of Search ................................ 280/7.12, 7.1, 280/7.11, 7.13, 7.14, 7.15, 8, 9, 10, 11, 841, 11.115, 11.12, 601, 845, 12.1, 12.11, 12.13, 13, 14, 22, 26, 14.1, 14.21, 28, 607, 608, 618

(56) References Cited

U.S. PATENT DOCUMENTS

| | | | | | |
|---|---|---|---|---|---|
| 38,571 | A | * | 5/1863 | Bois | 280/13 |
| 791,343 | A | * | 5/1905 | Holtman | 280/13 |
| 970,874 | A | * | 9/1910 | Beffel | 280/13 |
| 1,024,792 | A | * | 4/1912 | Leith | 280/13 |
| 1,068,120 | A | * | 7/1913 | Fransson | 280/13 |
| 1,218,128 | A | * | 3/1917 | Swanson | 280/13 |
| 1,288,007 | A | * | 12/1918 | Huykman | 280/13 |
| 1,303,388 | A | * | 5/1919 | Reach | 280/22.1 |
| 1,326,724 | A | * | 12/1919 | Grebenstein | 280/13 |
| 1,392,438 | A | * | 10/1921 | Nelson | 280/13 |
| 1,507,528 | A | * | 9/1924 | Suominen | 280/13 |
| 1,552,222 | A | * | 9/1925 | Moe | 280/13 |
| 1,642,714 | A | * | 9/1927 | Barrett | 280/13 |
| 1,657,534 | A | * | 1/1928 | Gingold | 280/13 |
| 2,352,966 | A | | 7/1944 | Morando | |
| 2,443,699 | A | * | 6/1948 | Swain | 280/13 |
| 2,523,950 | A | * | 9/1950 | Golubics | 280/13 |
| 3,774,926 | A | | 11/1973 | Chase | |
| 4,251,085 | A | | 2/1981 | Lageer et al. | |
| 4,479,657 | A | | 10/1984 | Reynolds | |
| 5,407,217 | A | | 4/1995 | Lambert et al. | |
| 5,413,361 | A | | 5/1995 | Mosher | |
| 5,427,390 | A | | 6/1995 | Duncan et al. | |

FOREIGN PATENT DOCUMENTS

| | | | | |
|---|---|---|---|---|
| EP | 391840 A1 | * | 10/1990 | B62B/17/02 |
| FR | 2621548 A1 | * | 4/1989 | B62B/19/02 |

* cited by examiner

Primary Examiner—Brian L. Johnson
Assistant Examiner—Hau Phan
(74) Attorney, Agent, or Firm—R.C. Baker & Associates, Ltd.

(57) ABSTRACT

The new skis for converting a wheeled push vehicle into a slidable push vehicle have a front anchor on their upper surfaces at a location proximate to the toe end and a rear anchor on their upper surfaces at a location proximate to the heel end. A flexible front harness assembly is attached to the front anchor, and a flexible rear harness assembly is attached to the rear anchor. The distance between the front anchor and the rear anchor is such that any aligned fore and aft wheel assemblies of a wheeled push vehicle to which the ski is capable of being attached can be positioned on the upper surface of the ski between the front and rear anchors to permit the front and rear harness assemblies to draw the fore and aft wheel assemblies away from each other and in a downward direction on the ski. A simple strap can serve as a harness assembly.

11 Claims, 2 Drawing Sheets

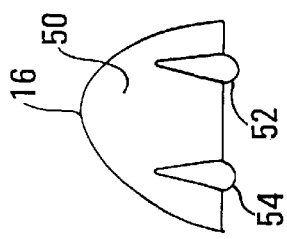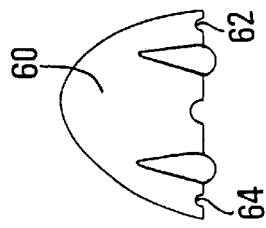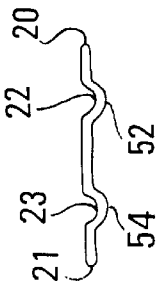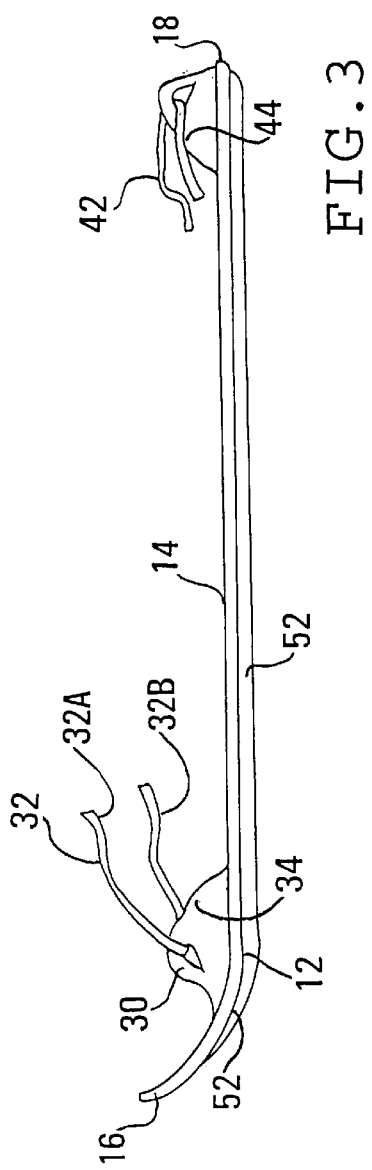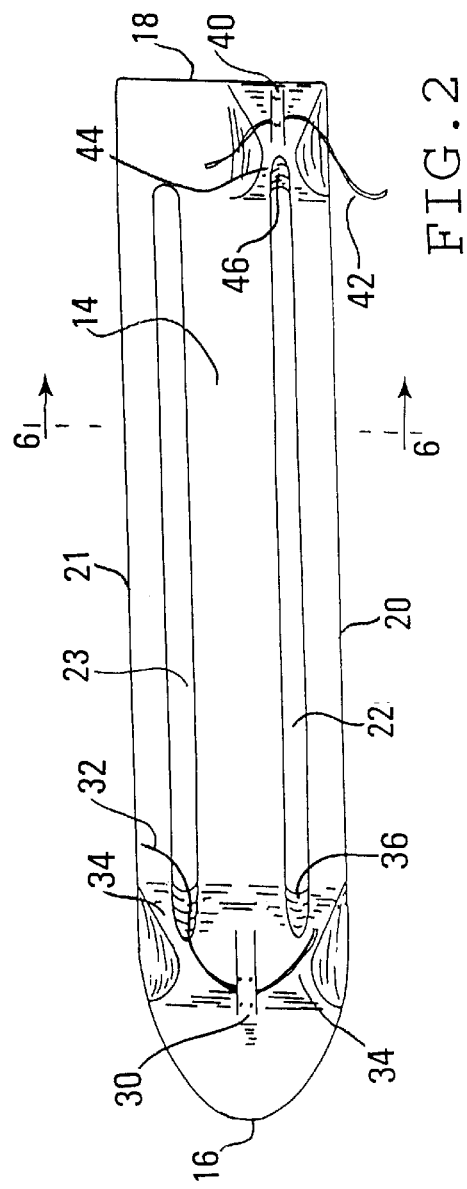

AUXILIARY SKIS

This invention relates to auxiliary skis for converting wheeled vehicles into slidable ones, and more particularly to a pair of skis for removable attachment to a wheeled push vehicle for the purpose of converting the wheeled push vehicle into a slidable runner vehicle. The new skis can quickly be detached to return the push vehicle to a wheeled support condition.

BACKGROUND OF THE INVENTION

A variety of ideas have been advanced for converting wheeled push vehicles such as child strollers into push vehicles having slidable runners for movement over snow. The thrust of known approaches for accomplishing such conversion have heretofore been limited to structures that either lock fore and aft wheels on each lateral side of the vehicle to a ski runner on each side without pulling or pushing the wheels either forward or backward on the ski, or to structures that rely upon elastic tensioning or elastic cables extending from a mid-part of the frame of a wheeled vehicle to a mid-part on the skis. In other words, the known approaches to the problem of providing a removable ski for the fore and aft wheels on a side of a wheeled push vehicle have used fastening or attachment techniques analogous to the techniques for fastening a ski boot to a ski, or have used extensible elastic cables or the like between frame elements of the vehicle and a central part of the ski. Simplicity of structure for the fastening of lateral skis to lateral fore and aft wheels of a wheeled push vehicle and removal of the skis from the wheels has not been a strong point for any known approach for converting a wheeled push vehicle into a slidable one.

SUMMARY OF THE INVENTION

This invention provides a pair of skis for converting a wheeled push vehicle having an aligned fore wheel assembly and aft wheel assembly on each side into a slidable push vehicle having a single slidable ski runner on each side. Each ski of the pair has a bottom slide surface, an upper surface, an upwardly curved toe end, and a heel end. A front anchor is on the upper surface of the ski at a location proximate to the toe end and a rear anchor is on the upper surface of the ski at a location proximate to the heel end. A flexible front harness assembly such as a strap is attached to the front anchor, and a flexible rear harness assembly such as a strap is attached to the rear anchor. There is no anchor at any location on the ski between the front and rear anchors. The distance between the front anchor and the rear anchor is rather significant. It is a distance such that any aligned fore wheel assembly and aft wheel assembly to which the ski is capable of being attached can be positioned on the upper surface of the ski between the front and rear anchors in a manner permitting the fastening of the front harness assembly to the fore wheel assembly so as to draw the fore wheel assembly in a forward and downward direction on the ski and in a manner permitting the fastening of the rear harness assembly to the aft wheel assembly so as to draw the aft wheel assembly in a rearward and downward direction on the ski.

Additional significant features for the new skis include a forward stop member on the upper surface against which a fore wheel assembly can be abutted when it is drawn and fastened by the front harness assembly. A similar rear stop member may be on the upper surface for abutting the aft wheel assembly thereto as it is drawn and fastened at the rear. A stabilizing wheel-receiving longitudinal groove may be formed in the upper surface adjacent the stop members and may extend into the stop members. The ski may include one or more longitudinal ridges or grooves on or in its bottom surface to facilitate ease of maintaining a direction for longitudinal sliding movement over snow. The ideal harness assemblies are simple flexible straps.

The new skis can be extremely simple. Ideally, each ski of a pair, including all of its parts except the front and rear harness assemblies, may be made of plastic molded into a single unitary article having the features herein described. The front and rear harness assemblies need be nothing more than a simple flexible strap fastenable to a wheel assembly by any of a variety of fastening techniques. A preferred fastening technique involves use of non-adhesive surfaces fastenable by pressure contact (e.g., hook and loop fastening).

Additional features, advantages, and attributes of the invention will become evident as this description proceeds.

DESCRIPTION OF THE DRAWINGS

FIG. 2 is a schematic plan view looking downward on a ski of the invention;

FIG. 3 is a schematic lateral side view of a ski of the invention;

FIG. 4 is a schematic frontal view of a ski according to the invention and illustrates ridges that extend longitudinally on the bottom surface of the ski;

FIG. 5 is a schematic frontal view of an alternative ski of the invention and illustrates longitudinal grooves into the bottom surface; and FIG. 6 is a cross-sectional view taken on line 6—6 of FIG. 2.

DESCRIPTION OF THE INVENTION

Figure 1:
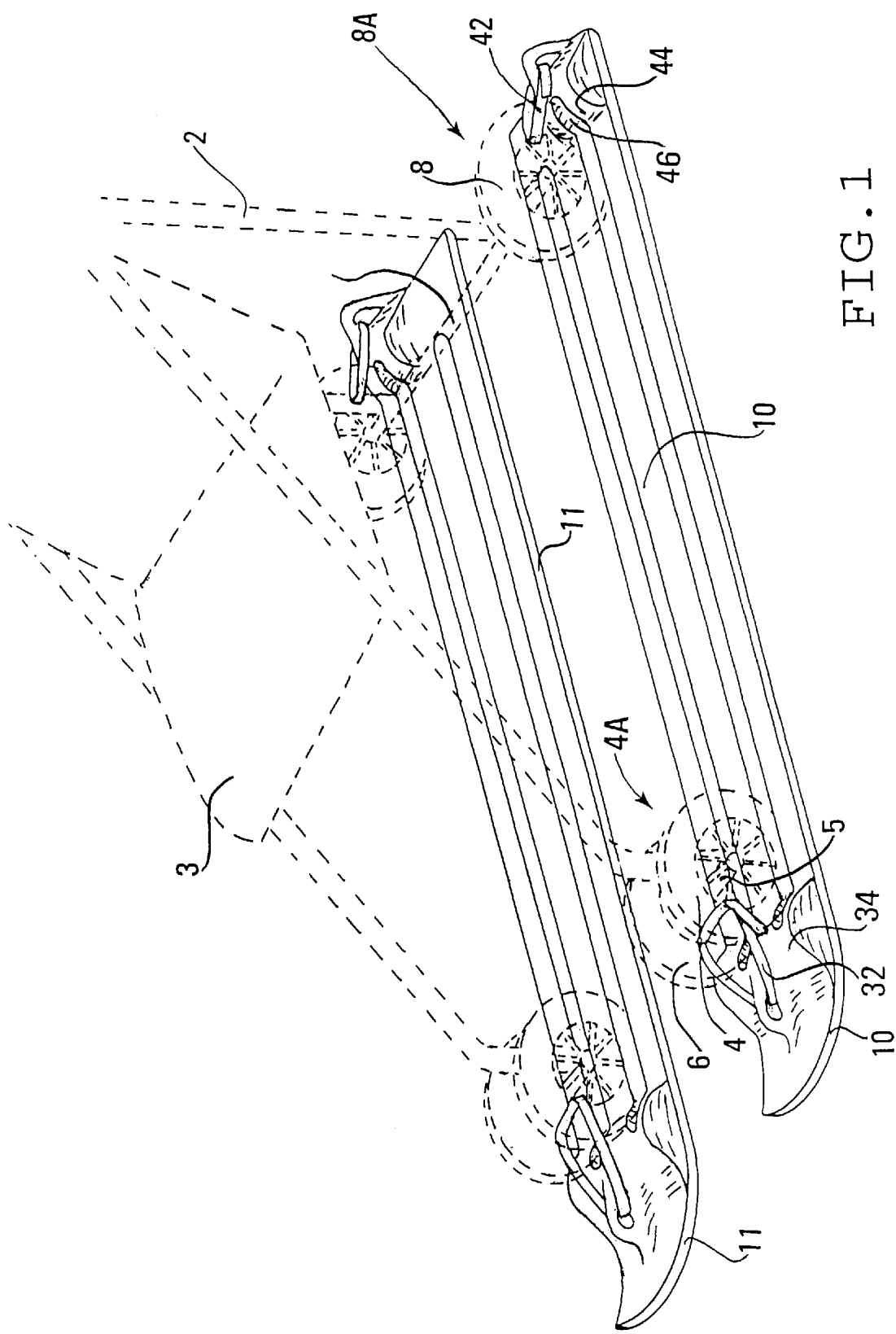
FIG. 1 is a schematic perspective view of a pair of skis of the invention and includes a phantom view of portions of a child's stroller to which the skis are attached by front and rear harness assemblies.

Referring to FIG. 1 of the drawing, the ideal wheeled push vehicle for which the skis 10 and 11 are designed is that of a child's stroller, although other wheeled push vehicles may be equipped with the skis of the invention as needed for traversing snow conditions. Importantly, for safety reasons, child strollers are pushed and thus keep the child ahead of and in the view of the care giver.

An illustrative stroller has a frame 2 and a seat 3. On each lateral side is a front wheel assembly 4A made up of dual wheels 4 and 6 with an axle 5 and a rear wheel assembly 8A that suitably may consist of a single wheel 8 on an axle 9. A fore wheel assembly 4A and a rear wheel assembly 8A may contain an equal number of wheels on each lateral side. Thus, the fore wheel assembly and aft wheel assembly on a lateral side may each have a single wheel, or each may have a dual wheel assembly.

Each ski 10 and 11 of the pair has certain features illustrated in the various views of the drawing. Each has a bottom surface 12 or under surface that rides on snow, an upper surface 14, an upwardly curved toe end 16 at the front or lead portion of the ski, and a heel end 18 at the tail end of the ski (see particularly FIGS. 2 and 3). Lateral sides 20 and 21 of the ski normally are parallel, although sometimes the lateral sides may be slightly wider at the toe end as compared to the heel end.

A front anchor 30 is on the upper surface of each ski at a location proximate to the toe end 16, and a rear anchor 40 is on the upper surface of each ski at a location proximate to the heel end 18. The anchors 30 and 40 have a significant function, namely that of providing a holding place or anchor for attaching flexible harness assemblies 32 and 42. The flexible front harness assembly 32 is attached to the front anchor 30 of the ski and the flexible rear harness assembly 42 is attached to the rear anchor 40. There is no anchor (and no need for any) at any location on the ski between the front anchor 30 and the rear anchor 40.

Importantly, the distance between the front anchor 30 and the rear anchor 40 must be such that any aligned fore wheel assembly 4A and aft wheel assembly 8A of a wheeled push vehicle to which the ski is capable of being attached can be positioned on the upper surface 14 between the front and rear anchors. This positioning is important because the fore 4A and aft 8A wheel assemblies on a side of a wheeled vehicle must be positioned on the upper surface of the ski to permit the fastening of the front harness assembly 32 to the fore wheel assembly 4A in a manner so as to permit drawing (i.e., pulling) of the fore wheel assembly 4A in a forward and downward direction on the ski. Further, the position of the aft wheel assembly 8A on the ski must be such as to permit the fastening of the rear harness assembly 42 to the aft wheel assembly 8A and thus allow the drawing (i.e., pulling) of the aft wheel assembly 8A in a rearward and downward direction on the ski.

An anchor 30 and 40 on the upper surface 14 need be no more than a hole through an upstanding bulge on the upper surface of the ski. The hole must be able to accommodate a harness assembly such as a strap. (A hook projecting up from the upper ski surface or any other structure that functions as an anchor can be used instead of a hole if desired.)

The preferred harness assembly is a strap, preferably one not only flexible but also relatively non-elastic. Ideally, the strap should be non-elastic in the ordinary meaning of the word (i.e., the strap preferably should not behave like a rubber band). End portions of the strap should be fastenable together as by a buckle or tie, or contact, or the like. The most ideal fastening for end portions of a strap is that of simple non-adhesive pressure contact. Straps fastenable by non-adhesive pressure contact are well-known under the brand name VELCRO. Fasteners of the VELCRO type frequently have one end surface 32A of the strap equipped with tiny hooks and the other or opposite end of the strap surface 32B equipped with tiny loops. To be recognized, however, is that VELCRO-style fasteners can be formed using a variety of hook-type elements on both ends and fastening can be accomplished by intertwining the hooks of one end with the hooks of the other. Any mechanical non-adhesive secure pressure fastening can be considered the equivalent of a VELCRO type or style of fastening for purposes of this invention.

The anchor 30 and anchor 40 on the upper surface of the ski are at a relatively low elevation with respect to the upper surface and are ideally on or in a bulge of the upper surface. An anchor (such as a hole or loop or hook) cannot be at a higher elevation with respect to the upper surface of the ski than the axis of the wheel of the wheel assemblies on the push vehicles. In fact, the anchor 30 and 40 should be at a lower elevation than the axis for the wheels acted upon by the fastening straps or harness attached to the anchor. This is most significant. The most practical way for fastening a harness assembly such as a simple strap to a wheel (or wheels) of a wheeled assembly is to draw the strap around the rim of the wheel and pull the strap into a taut condition and fasten it in that condition. That taut condition pulls the wheel in the direction of the anchor; and in a practical sense, the line of force exhibited by the tension of the strap in taut condition about the rim of the wheel is such as to fall within a radial line extending from the axis of the wheel to the anchor. This radial line should be in a direction downward from the axis of the wheel in order to effectively draw (i.e., pull) the wheel in a downward direction on the ski as the wheel is drawn (i.e., pulled) in the direction of the anchor. The location of the anchor can be at an extremely modest elevation on the upper surface of the ski. (Where wheels lacking spokes prevent entraining a strap about the rims, it is suitable to entrain the strap about the axis shaft adjacent the wheel or wheels (and thus part of a wheel assembly) in order to achieve the strong and secure fastening and pulling force on the wheel assembly.)

Stop members are preferably employed and serve as an abutment against which the wheel or wheels of a wheel assembly are drawn (i.e., pulled) when fastened by a harness assembly. A forward stop member 34 is suitably integral with the foundation or bulge for the front anchor 40 in that the molding of the plastic forming the ski can be shaped to form a bulge for the front anchor 30 and also shaped for front stop 34. Similarly, the rear stop member 44 is molded integrally with the bulge for rear anchor 40. The exact shape of stop members and anchors can vary, but the features and functional performance are of strong significance. When the harness assemblies pull the wheels of a wheel assembly toward anchors at each end (thus pulling the wheel assemblies into abutting condition against stop members 34 and 44), the very nature of the act of drawing the wheel assemblies toward the anchors at each end of the ski contributes to stability for the wheel assemblies on the ski. Ideally, the upward bulge for a stop member is but a continuation of the upward bulge for an anchor.

Stability for the wheels of a wheel assembly on the upper surface of a ski can be enhanced by using a brake if the wheel assembly is equipped with a brake. Brakes can hold the wheels in a straight condition (i.e., a non-turned condition) for better alignment of the fore and aft wheels on a side of a wheeled push vehicle.

Significant wheel assembly stability is gained by using longitudinal wheel-receiving grooves 22 and 23 in the ski upper surface. Grooves 22 and 23 ideally extend in a curve 36 into the forward stop member 34 and in a curve 46 into rear stop member 44 and serve as a cradle for holding the wheels in a non-turned and non-tilted condition.

When a harness assembly is pulled tight on a wheel assembly, it effectively draws the wheel (or wheels) of the wheel assembly into a lodged or an abutted condition in the groove of the stop member as well as in the longitudinal section on the upper surface of the ski adjacent to the stop member. This is so because the vector of the pulling force by the front and rear harness straps 32 and 42 on the wheel rims of the wheel assemblies is downward toward the ski as well as outward toward the toe and heel of the ski.

While longitudinal grooves 22 and 23 extend the entire length of the ski between stop members 34 and 44 as illustrated in the drawing, it is suitable to employ longitudinal wheel-receiving grooves at the end portions of the ski adjacent the anchor features at each end in order to provide a cradle recess for wheels to lodge when the respective wheel assemblies at each end are drawn by the harness assemblies at each end toward the anchors at each end. The use of stop members is preferred, and the ideal stop members have grooves for wheels extended into them from the longitudinal grooves on the upper surface of the ski adjacent the stop members.

A feature for contributing to easy straight line movement of the bottom slide surface of the skis over snow is that of one or more longitudinal ridges 52 and 54 extending the length of the ski (see FIGS. 3 and 4). An optional alternative is that of employing one or more longitudinal grooves into the bottom slide surface of the ski. Illustrated in FIG. 5 are longitudinal grooves 62 and 64 into the bottom slide surface of a ski. They can help in maintaining a straight line of forward movement as the ski is pushed over snow. The viewer of FIG. 5 faces the upwardly curved tow end 60.

A pair of skis of the character illustrated can be manufactured in an extremely simple manner. The entire structure of the ski apart from the harness assemblies is most ideally formed out of plastic molded to the contours and shapes of the elements forming the ski other than the strap-like harness assemblies. Economical plastic in the nature of polyethylene is suitable to employ, although vinyls, acrylics, styrenes, etc., can likewise be suitable as the organic plastic material for forming the ski. The simplicity of the ski structure of this invention makes it convenient for the user to place both skis of a pair in a storage place (such as a rack or tray or netting) under the seat of a stroller during periods of non-use. Such a storage place is not shown in the drawing but is a common feature for child strollers. Removing the skis from the storage location of a stroller and affixing them in a fastened condition under aligned fore and aft wheel assemblies on each lateral side of the stroller can be conveniently and easily accomplished at the time the skis are needed as slidable runners for traversing snow.

Not only is economy of structure employed, but in addition, economy in terms of total cost for skis of the invention is enhanced by the fact of their simplified structure.

Further, those skilled in the art will readily recognize that this invention may be embodied in still other specific forms than illustrated without departing from the spirit or essential characteristics of it. The illustrated embodiments are therefore to be considered in all respects illustrative and not restrictive. The scope of the invention is indicated by the appended claims, and all variations that come within the meaning and range of equivalency of the claims are intended to be embraced thereby.

What is claimed is:

1. A pair of skis for converting a wheeled push vehicle having an aligned fore wheel assembly and aft wheel assembly on each side into a slidable push vehicle having a single slidable ski runner on each side, each said ski having a bottom slide surface, an upper surface, an upwardly curved toe end, a heel end, a front anchor on said upper surface at a location proximate to said toe end, a rear anchor on said upper surface at a location proximate to said heel end, a flexible front harness assembly attached to said front anchor and a flexible rear harness assembly attached to said rear anchor, there being no anchor at any location on said ski between said front anchor and said rear anchor, the distance between said front anchor and said rear anchor being such that any aligned fore wheel assembly and aft wheel assembly to which said ski is capable of being attached can be positioned on the upper surface of said ski between said front and rear anchors in a manner permitting the fastening of said front harness assembly to the fore wheel assembly so as to draw the fore wheel assembly in a forward direction toward the toe end of the ski as well as in a downward direction on said ski and in a manner permitting the fastening of said rear harness assembly to the aft wheel assembly so as to draw the aft wheel assembly in a rearward direction toward the heel end of the ski as well as a downward direction on said ski.

2. The pair of skis of claim 1 wherein each ski includes a forward stop member on said upper surface against which a fore wheel assembly can be abutted by fastening said front harness assembly thereto.

3. The pair of skis of claim 2 wherein each ski includes at least one longitudinal groove in said upper surface and extending into said forward stop member, said groove being for receiving a wheel of a fore wheel assembly.

4. The pair of skis of claim 1 wherein each ski includes a rear stop member on said upper surface against which an aft wheel assembly can be abutted by fastening said rear harness assembly thereto.

5. The pair of skis of claim 4 wherein each ski includes at least one longitudinal groove in said upper surface and extending into said rear stop member, said groove being for receiving a wheel of an aft wheel assembly.

6. The pair of skis of claim 1 wherein each ski includes at least one longitudinal groove in said upper surface for receiving a wheel of a fore wheel assembly.

7. The pair of skis of claim 1 wherein each ski includes at least one longitudinal groove in said upper surface for receiving a wheel of an aft wheel assembly.

8. The pair of skis of claim 1 wherein each ski includes at least one longitudinal ridge or groove on or in said bottom surface.

9. The pair of skis of claim 1 wherein at least one of said harness assemblies consists essentially of a flexible strap.

10. The pair of skis of claim 1 wherein each said harness assembly consists of a strap equipped with non-adhesive surfaces capable of being fastened together by mere pressure contact.

11. The pair of skis as in any one of claims 1, 2, 3, 4, 5, 6, 7, 8, 9, or 10 wherein, except for said harness assemblies, each said ski has all of its parts made of plastic molded into a single unitary article.

* * * * *